United States Patent
Michelazzo et al.

(10) Patent No.: US 10,286,440 B2
(45) Date of Patent: May 14, 2019

(54) METHOD AND KIT FOR JOINING A TUBULAR MEMBER AND A PIPELINE FOR CONVEYING CORROSIVE PRODUCTS

(71) Applicant: SAIPEM S.p.A., San Donato Milanese (IT)

(72) Inventors: Luca Michelazzo, Mestrino (IT); Francesco Cavallini, Povegliano Veronese (IT); Riccardo Giolo, Borbiago di Mira (IT)

(73) Assignee: SAIPEM S.P.A., San Donato Milanese (IT)

( * ) Notice: Subject to any disclaimer, the term of this patent is extended or adjusted under 35 U.S.C. 154(b) by 347 days.

(21) Appl. No.: 15/120,968

(22) PCT Filed: Feb. 25, 2015

(86) PCT No.: PCT/IB2015/051400
§ 371 (c)(1),
(2) Date: Aug. 23, 2016

(87) PCT Pub. No.: WO2015/128813
PCT Pub. Date: Sep. 3, 2015

(65) Prior Publication Data
US 2016/0361748 A1    Dec. 15, 2016

(30) Foreign Application Priority Data

Feb. 25, 2014  (IT) .............. MI2014A0285

(51) Int. Cl.
*F16L 13/14*   (2006.01)
*F16L 39/00*   (2006.01)
(Continued)

(52) U.S. Cl.
CPC ............. *B21D 39/04* (2013.01); *B21D 39/20* (2013.01); *B21D 39/203* (2013.01);
(Continued)

(58) Field of Classification Search
CPC . F16L 13/14; F16L 13/00; F16L 23/00; F16L 58/181; F16L 58/187; F16L 58/08;
(Continued)

(56) References Cited

U.S. PATENT DOCUMENTS 2,268,142 A  * 12/1941 Lusher ................. F16L 33/213
                                                285/148.16
2,479,702 A    8/1949 Rood
(Continued)

FOREIGN PATENT DOCUMENTS

DE        19501770         7/1996
DE        10338348         4/2005
(Continued)

OTHER PUBLICATIONS

Letter to International Bureau of WIPO dated Jul. 28, 2015 for International Application No. PCT/IB2015/051400.
(Continued)

*Primary Examiner* — Ryan J. Walters
*Assistant Examiner* — Lawrence Averick
(74) *Attorney, Agent, or Firm* — Neal, Gerber & Eisenberg LLP

(57) ABSTRACT

A method of joining a tubular member and a pipeline configured to convey corrosive products comprises preparing a tubular member with an inner seat; inserting the end of a pipeline inside the inner seat; inserting a sleeve of corrosion-resistant material inside the end of the pipeline; inserting an expandable mandrel inside the sleeve; and expanding the expandable mandrel to join the end of the pipeline and the tubular member, and seal the sleeve and the pipeline to protect parts of the pipeline, sensitive to corrosive products, via the sleeve.

12 Claims, 3 Drawing Sheets

(51) Int. Cl.
  *B21D 39/20* (2006.01)
  *B21D 39/04* (2006.01)
  *F16L 58/08* (2006.01)
  *F16L 58/18* (2006.01)

(52) U.S. Cl.
  CPC .............. *F16L 13/147* (2013.01); *F16L 58/08* (2013.01); *F16L 58/181* (2013.01); *F16L 58/187* (2013.01)

(58) Field of Classification Search
  CPC ......... F16L 13/147; F16L 27/00; F16L 37/00; F16L 39/00; F16L 49/00; B21D 39/04; B21D 39/20; B21D 39/203; B60C 29/066; E03D 11/13; F22B 37/107
  See application file for complete search history.

(56) References Cited

U.S. PATENT DOCUMENTS

| | | | | |
|---|---|---|---|---|
| 2,787,481 | A * | 8/1952 | Buschow et al. | F16L 13/007 285/148.11 |
| 3,165,338 | A | 1/1965 | Moss | |
| 3,598,156 | A * | 8/1971 | Ulmer | F16L 9/02 138/140 |
| 4,524,997 | A * | 6/1985 | Ebert | F16L 37/113 285/258 |
| 6,405,762 | B1 * | 6/2002 | Bunch | E21B 17/01 138/109 |
| 8,118,331 | B2 * | 2/2012 | Yamashita | F16L 13/007 285/113 |
| 2008/0087418 | A1 * | 4/2008 | Cook | B21D 39/203 166/207 |
| 2008/0303277 | A1 * | 12/2008 | Yamashita | F16L 13/007 285/382.5 |

FOREIGN PATENT DOCUMENTS

| | | |
|---|---|---|
| EP | 0802002 | 10/1997 |
| FR | 2480900 | 10/1981 |
| FR | 2917151 | 12/2008 |
| WO | WO 01/98701 | 12/2001 |

OTHER PUBLICATIONS

International Search Report and Written Opinion for International Application No. PCT/IB2015/051400 dated May 12, 2015.
Notification of Transmittal of the International Preliminary Report on Patentability (Form PCT/IPEA/416) for International Application No. International Application No. PCT/IB2015/051400 dated Jun. 20, 2016.
Notification of the Recording of a Change for International Application No. PC/IB2015/051400 dated Jul. 29, 2016.
Notification of the Recording of a Change for International Application No. PCT/IB2015/051400 dated Jul. 29, 2016.

* cited by examiner

METHOD AND KIT FOR JOINING A TUBULAR MEMBER AND A PIPELINE FOR CONVEYING CORROSIVE PRODUCTS

PRIORITY CLAIM

This application is a national stage application of PCT/IB2015/051400, filed on Feb. 25, 2015, which claims the benefit of and priority to Italian Patent Application No. MI2014A000286, filed on Feb. 25, 2014, the entire contents of which are each incorporated by reference herein.

BACKGROUND

In the petrochemical sector, corrosive products, such as hydrocarbons with a high sulphide and/or carbon dioxide content, are known to be conveyed along metal pipelines. In addition to good mechanical properties, the pipelines configured to convey corrosive products must have high resistance to corrosion; for said purpose, they have a metal wall covered by an inner coating which is made of metal alloys configured to withstand the corrosive agents and which is joined to the wall by cladding or by lining.

The pipelines clad or lined with the above-mentioned metal alloys are resistant to the aggressiveness of the corrosive products. However, the protection afforded by the cladding or lining is diminished when one end of the pipeline is joined to a tubular member.

The joint between a tubular member and the end of a pipeline is dictated, for example, by the need to connect the pipeline to a flanged connector adapted to repair a damaged pipeline.

A relatively simple method of joining a tubular member and a pipeline is described in European Patent No. 802,002 and PCT Patent Application No. WO 01/98701 and comprises the steps of inserting the end of the pipeline comprising an inner face, an outer face, and a front face, adjacent to the inner and outer faces, inside an inner seat of the tubular member, inserting an expandable mandrel inside the end of the pipeline, and expanding the expandable mandrel to join the end of the pipeline and the connector and eventually a forge member located therebetween.

The methods described above are not able to preserve the protection provided by the protective cladding/lining, even if the entire connector is made of corrosion-resistant material, because at least the front face of the pipeline is without the protective cladding/lining and, in use, could be, arranged in contact with the corrosive products. Furthermore, infiltrations of corrosive fluid could occur also along the portion of outer face adjacent to the front face.

SUMMARY

The present disclosure concerns a method for joining a tubular member and a pipeline configured to convey corrosive products.

One advantage of the present disclosure is to provide an efficient and relatively inexpensive method for joining a tubular member to the end of a pipeline configured to conduct corrosive products.

According to the present disclosure, a method is provided for joining a tubular member and a pipeline configured to convey corrosive products; the method comprising the steps of preparing a tubular member made of metallic material resistant to corrosion or at least having a coating suited to protect from the aggressive chemical agents contained in the corrosive products and having an inner seat with an indented axial profile; inserting the end of a pipeline inside the inner seat of the tubular member; the pipeline extending along an axis and having a tubular wall, which is defined as a whole by a supporting structure made of steel and by an inner coating applied to the supporting structure by cladding or lining, said wall having an inner face, a front face, and an outer face; the tubular member comprising a tubular face configured to align with the inner face of the pipeline; inserting a sleeve of corrosion-resistant material inside the end of the pipeline so as to position part of the sleeve at the tubular face, and another part of the sleeve at the inner face and the inner seat; inserting an expandable mandrel inside the sleeve; and expanding the expandable mandrel to join the end of the pipeline and the tubular member, seal the sleeve and the pipeline, and shield parts of the pipeline, sensitive to corrosive products, via the sleeve by deforming an annular portion of the sleeve against the pipeline, and the pipeline against the tubular member, inside the inner seat, and deforming another annular portion of the sleeve directly against the tubular member. In this way, with one single operation it is possible to join the pipeline and the tubular member and shield the parts of the pipeline sensitive to the corrosive fluids.

According to an alternative embodiment of the present disclosure there is provided a method of joining a tubular member and a pipeline configured to convey corrosive products; the method comprising the steps of preparing a tubular member made of metallic material resistant to corrosion or at least having a coating suited to protect from the aggressive chemical agents contained in the corrosive products and having with an inner seat having an indented axial profile; inserting the end of a pipeline inside the inner seat of the tubular member; the pipeline extending along an axis and having a tubular wall, which is defined as a whole by a supporting structure made of steel and by an inner coating applied to the supporting structure by cladding or lining, said wall having an inner face, a front face, and an outer face; the tubular member comprising a tubular face configured to align with the inner face of the pipeline; inserting a sleeve of corrosion-resistant material inside the end of the pipeline wherein the sleeve has a U-shaped turn-up configured to cover the inner face, the front face, and the outer face of the pipeline; the turn-up being housed inside the inner seat, between the pipeline and the tubular member; inserting an expandable mandrel inside the sleeve; and expanding the expandable mandrel to join the end of the pipeline and the tubular member, seal the sleeve and the pipeline, and shield parts of the pipeline, sensitive to corrosive products, via the sleeve.

According to said embodiment, the sleeve shields the sensitive parts of the pipeline and covers said sensitive parts.

According to certain embodiments of the present disclosure, the sleeve is thinner than the pipeline. In this way, the sleeve is subject to a plastic deformation greater than the plastic deformation of the pipeline and this enables sealing of the sleeve to the pipeline.

According to certain embodiments of the present disclosure, the pipeline is thinner than the tubular member. In this way, the pipeline deforms against the tubular member to create a mechanical coupling.

In certain embodiments, the mandrel is so expanded as to produce a plastic deformation at least of the end of the pipeline, and of the sleeve.

In certain embodiments, the expansion of the expandable mandrel located at least along an annular portion of the sleeve.

In practice, it, is sufficient to plastically deform only some parts of the sleeve and the end of the pipeline.

In certain embodiments the tubular member comprises, inside the inner seat, an annular projection configured to contact, the outer face of the pipeline, and at least one recess at the inner face to define the indented profile.

In certain embodiments, the sleeve extends the whole length of the tubular face.

When the tubular member is not made of corrosion-resistant material, then it is necessary to provide protection of the tubular member along the tubular face. According to said embodiment, the sleeve shields the sensitive parts of the pipeline and covers said sensitive parts.

In certain embodiments, the steps of inserting the sleeve and the expandable mandrel inside the pipeline comprise first fitting the sleeve around the expandable mandrel and inserting the sleeve together with the expandable mandrel inside the pipeline. This solution is relatively practical and reduces the work times.

In certain embodiments, the expandable mandrel comprises a center body and at least two sealing rings spaced apart along the center body to define an, expansion chamber between the center body, the two sealing rings and the sleeve, the step of expanding the expandable mandrel being performed by pumping pressurized fluid inside the expansion chamber.

In practice, the expandable mandrel is an hydroforming mandrel provided with an expansion chamber.

In certain embodiments, the expandable mandrel comprises four sealing rings to define at least two expansion chambers configured to receive pressurized fluid and spaced apart along the center body. In this way, it is possible to seal the sleeve in two distinct separate areas.

A further advantage of the present disclosure is to produce a kilt configured to join a tubular member and a pipeline configured to conduct corrosive products which is free from certain of the drawbacks of certain of the known art.

According to the present disclosure, a kit is produced for joining a tubular member and a pipeline configured to conduct corrosive products; the kit comprising a sleeve made of corrosion-resistant material and configured to be arranged inside one end of the pipeline in turn inserted in an inner seat of a tubular member; and an expandable mandrel configured to be inserted inside the sleeve and is configured to be expanded to join the end of the pipeline and the tubular member, seal the sleeve to the pipeline and to the tubular member so as to shield via the sleeve parts of the pipeline sensitive to corrosive products, wherein the expandable mandrel comprises a center body and at least two sealing rings spaced apart along the center body to define an expansion chamber between the center body, the two sealing rings and the sleeve.

According to the present disclosure it is possible to define two separate sealing areas obtained via an expandable mandrel comprising four sealing rings to define at least two expansion chambers configured to receive pressurized fluid and spaced apart along the center body.

In accordance with an alternative embodiment of the present disclosure there is provided a kit configured to join a tubular member and a pipeline configured to conduct corrosive products, wherein the pipeline extends along an axis and has a tubular wall, which is defined as a whole by a supporting structure made of steel and by an inner coating applied to the supporting structure by cladding or lining, said wall having an inner face, a front face, and an outer face, and wherein the tubular member is made of metallic material resistant to corrosion or at least has a coating suited to protect from the aggressive chemical agents contained in the corrosive products and has an inner seat having an indented axial profile; the kit comprising a sleeve of corrosion-resistant material, which is configured to be inserted inside the end of the pipeline and has a U-shaped turn-up configured to cover the inner face, the front face, and the outer face of the pipeline so that the turn-up is housed inside the inner seat, between the pipeline and the tubular member; and an expandable mandrel configured to be inserted inside the sleeve and to be expanded to join the end of the pipeline and the tubular member, seal the sleeve and the pipeline, so as to shield parts of the pipeline, sensitive to corrosive products via the sleeve.

Additional features and advantages are described in and will be apparent from the following Detailed Description and the figures.

BRIEF DESCRIPTION OF THE DRAWINGS

Further characteristics and advantages of the present disclosure will appear clear from the following description of the non-limiting embodiment examples thereof, with reference to the attached figures, in which.

DETAILED DESCRIPTION

Figure 1:
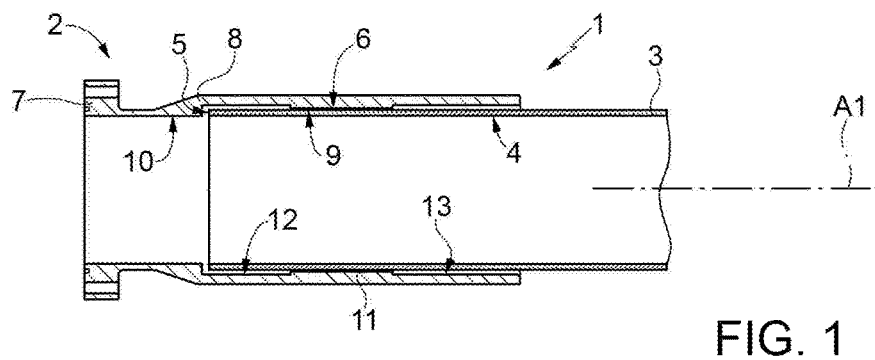
FIGS. 1 to 3 are longitudinal section views, with parts removed for clarity, of respective steps of the method subject of the present disclosure.

Referring now to the example embodiments of the present disclosure illustrated in FIGS. 1 to 11, with reference to FIG. 1, number 1 indicates overall an underwater pipeline configured to conduct liquids or gases, in particular hydrocarbons which are particularly corrosive because they are rich in hydrogen sulphides and carbon dioxide, and number 2 indicates a tubular member which, in the case illustrated is defined by a flanged connector and is arranged around one end of the pipeline 1.

The pipeline 1 extends along an axis A1 and has a tubular wall 3, which is defined as a whole by a supporting structure and by an inner coating applied to the supporting structure by cladding or lining. The supporting structure of the wall 3 is made of steel, while the coating is made of a metal alloy able to withstand the chemical attacks of the corrosive substances contained in the hydrocarbons. The wall 3 therefore has an inner face 4 resistant to the corrosive products, and a front face 5 and an, outer face 6 which are not able to withstand the corrosive products.

The tubular member 2 is inserted around the end of the pipeline 1, extends around the pipeline 1 and comprises a flange 7 configured to provide a bolted joint; and a tubular body 8, which has an inner seat 9 configured to house the end of the pipeline 1, and a tubular face 10 adjacent to the inner seat 9 and coplanar with the inner face 4 of the pipeline 1.

The inner seat 9 is arranged on the opposite side of the flange 7, has an indented profile and is defined by an indent with respect to the tubular face 10. In the inner seat 9 an annular projection 11 extends in a radial direction towards the axis A1. The annular projection 11 is, arranged in a central position to define two annular recesses 12 and 13 arranged on opposite sides with respect to said annular projection 11.

The tubular element 2 is made of metallic material resistant to corrosion or at least has a coating suited to protect the tubular element from the aggressive chemical agents contained in the corrosive products.

The pipeline 1, and more specifically the wall 3 of the pipeline 1 is thinner than the tubular element 2, and more specifically thinner than the tubular body 8 at the inner seat 9.

Figure 2:
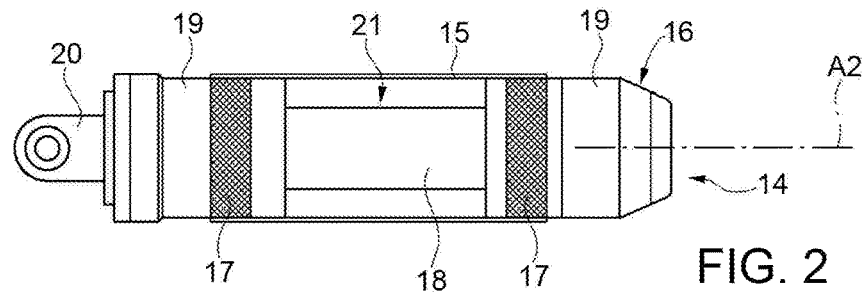

With reference to FIG. 2, number 14 indicates an expandable mandrel, and number 15 indicates a sleeve fitted around the expandable mandrel 14.

The expandable mandrel 14 extends along a longitudinal axis A2 and comprises a frame 16 and two sealing rings 17.

In the case in point, the frame 16 comprises a center body 18, two end elements 19 and a gripping member 20. The sealing rings 17 are spaced apart along, the center body 18 and delimit together with the center body 18 and the sleeve 15 an expansion chamber 21 configured to be filled with a pressurized fluid.

The sleeve 15 is made of a metal alloy resistant to corrosion and is thinner than the wall 3 of the pipeline 1 (FIG. 1).

The sleeve 15 has a length such that its ends extend into the inner seat from one sealing ring 17 to the other sealing ring 17.

Figure 3:
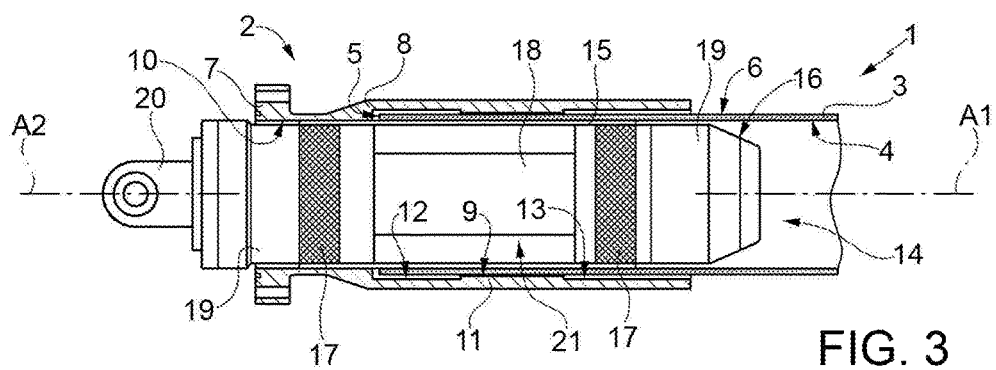

With reference to FIG. 3, the expandable mandrel 14 and the sleeve 15 fitted on the expandable mandrel 14 are inserted inside the pipeline 1 and the tubular member 2.

The expandable mandrel 14 is inserted in the pipeline 1 and in the tubular member 2 so as to arrange a sealing ring 17 in the annular recess 13 and the other sealing ring 17 at the tubular face 10.

In practice, the sleeve 15 extends partly in the area of the tubular face 10 of the tubular member 2 and partly along the inner face 4 of the pipeline 1.

Once the expandable mandrel 14 and the sleeve 15 are correctly positioned, the expandable mandrel 14 and the sleeve 15 are locked in position by expansion of the sealing rings 17 so as to hermetically close the expansion chamber 21. Subsequently, a pressurized liquid is sent to the expansion chamber 21 at a pressure such as to deform at least the end of the pipeline 1 and the sleeve 15.

The deformation of the end of the pipeline 1 at the inner seat 9 produces a mechanical coupling with the tubular member 2 at the annular projection 11 and the annular recesses 12 and 13. In practice, the end of the pipeline deforms around the annular projection 11. In other words, the end of the pipeline 1 plastically deforms and occupies wholly or partly the free space of the annular recesses 12 and 13 and hooks to the annular projection 11.

The sleeve 15 is also subject to, a plastic deformation and adapts to the shape of the end of the pipeline 1 and hermetically adheres to the pipeline.

In further detail, the deformation produced by the expandable mandrel 14 comprises partly a plastic deformation and partly an elastic deformation which comprises an elastic return. The elastic return of the end of the pipeline 1 is greater than the elastic return of the sleeve 15. Consequently, the sleeve 15 adheres intimately to the end of the pipeline 1.

Said operation which comprises plastic deformation of the metal parts is called cold forging. Although the present description refers to an expandable hydroforming mandrel 14, the present disclosure in its broadest form is not limited to the use of the expandable mandrel 14 but comprises the use of mandrels in which the plastic deformation is obtained directly with mechanical members.

Figure 4:
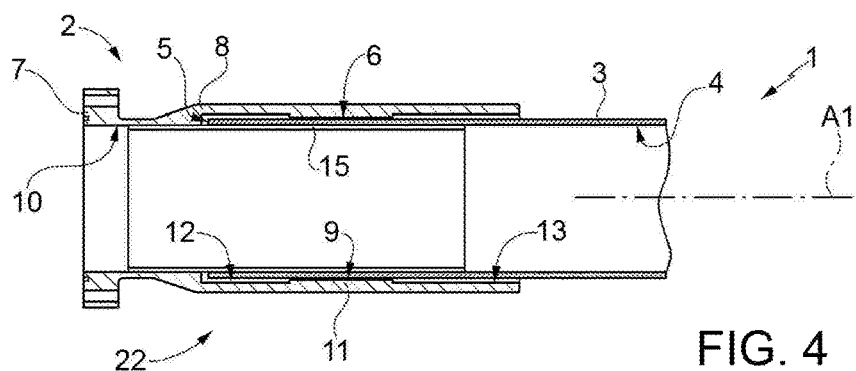
FIG. 4 is a longitudinal section view, with parts removed for clarity and parts in section, of a tubular assembly obtained by the method subject of the present disclosure, some steps of which are illustrated in FIGS. 1 to 3.

FIG. 4 illustrates a tubular assembly 22 obtained by the method described and comprising the pipeline 1, the tubular member 2, and the sleeve 15 joined to one another. The sleeve 15 has the function of shielding the area between the pipeline 1 and the tubular face 10 of the tubular member 2 so that the corrosive fluid cannot come into contact with the front face 5 and the outer face 6 of the pipeline 1.

Figure 5:
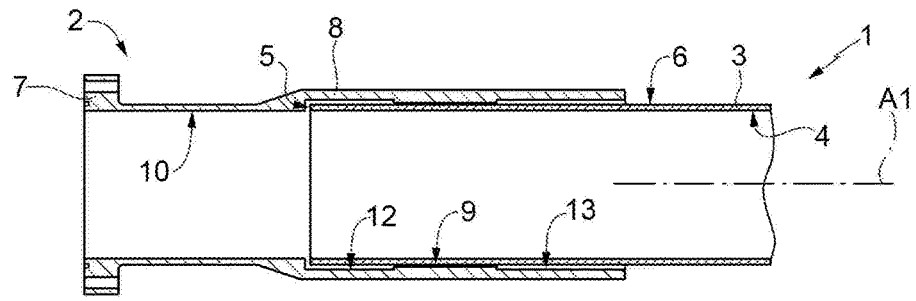
FIGS. 5 to 7 are longitudinal section views, with parts removed for clarity, of respective stages of the method according to an alternative embodiment of the present disclosure.
Figure 6:
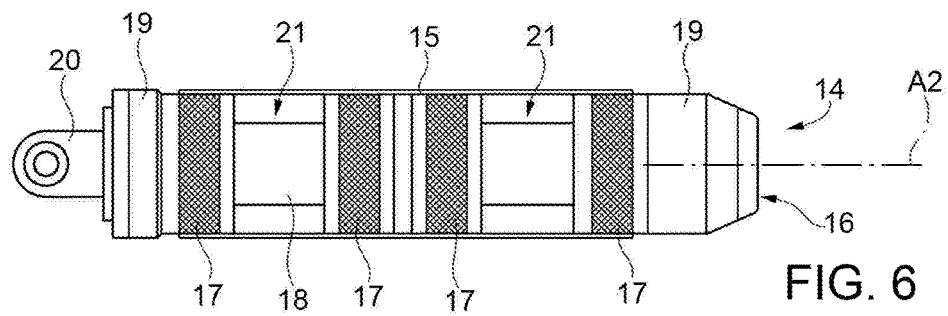
Figure 7:
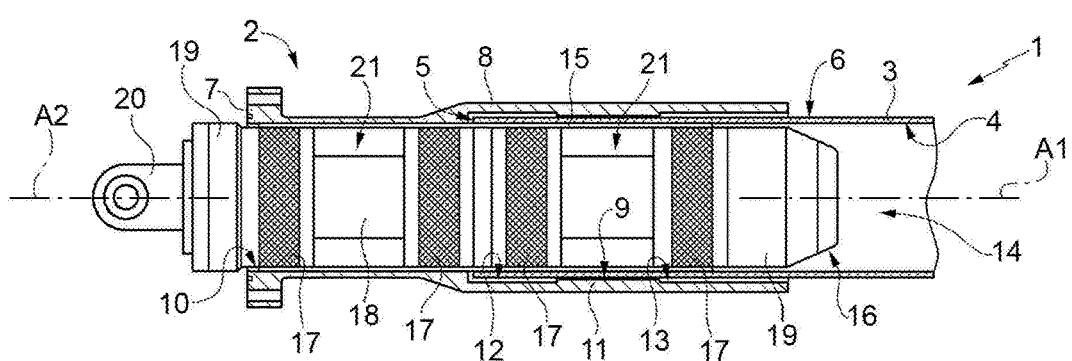

With reference to FIGS. 5 to 7, an embodiment of the method subject of the disclosure is illustrated which is similar to the one described with reference to FIGS. 1 to 3, and differs from the latter due to the tubular member 2 having a tubular face 10 particularly extended in the axial direction, a particularly long sleeve 15, and an expandable mandrel 14 adapted to define two expansion chambers 21 and, therefore, two separate deformation areas in an axial direction.

Figure 8:
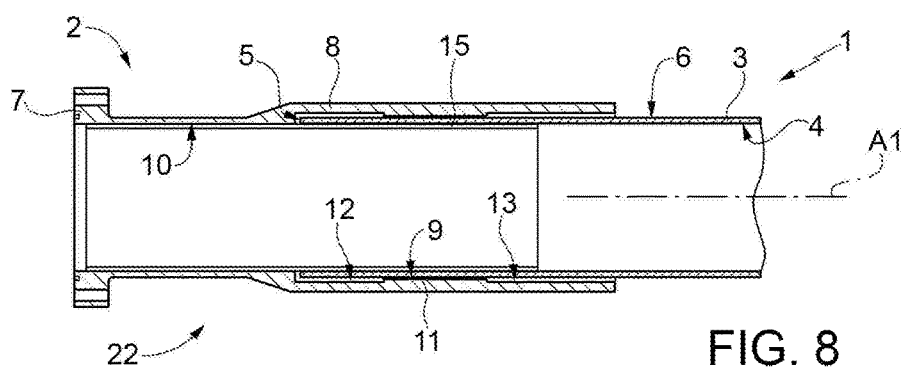
FIG. 8 is a longitudinal section view, with parts removed for clarity, of a tubular assembly produced using the method subject of the present disclosure, some steps of which are illustrated in FIGS. 1 to 3.

In FIG. 8, the tubular assembly 22 obtained with the method shown, at least partly, in FIGS. 5 to 7 comprises two deformed areas in which the sleeve 15 has been hermetically sealed, on one side to the tubular member 2 and on the other side to the pipeline 1. According to said embodiment, the areas involved in the deformation are arranged on opposite sides with respect to the area in which the front face 5 of the pipeline 1 is arranged. In some cases, it is expedient to avoid an excessive plastic deformation at the front face 5 where an annular groove may be present which could be filled with the deformed material of the sleeve 15. The groove would enable an excessive flow of material inside the groove itself and would make the sleeve 15 excessively thin, thereby excessively reducing the thickness of the sleeve 15 in that area to the extent of jeopardising the corrosion protection.

Figure 9:
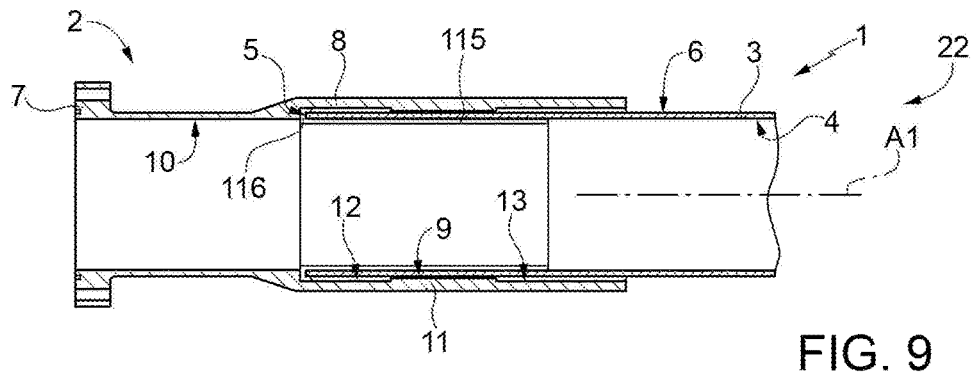
FIGS. 9 and 10 are longitudinal section views, with parts removed for clarity, of respective tubular assemblies produced using respective alternative methods of the present disclosure.

With reference to FIG. 9, the tubular assembly 22 comprises a sleeve 115, which is provided with a turn-up 116 and is fitted on the end of the pipeline 1 to cover part of the inner face 4, the front face 5 and part of the outer face 6. The turn-up 116 is housed in the annular recess 12. The method for producing the tubular assembly 22 of FIG. 9 comprises fitting the sleeve 115 on the end of the pipeline 1, arranging the tubular member 2 around the end of the pipeline 1, inserting the expandable mandrel 14 inside the pipeline 1 and the tubular member 2, and deforming the area of the pipeline 1 and sleeve 115 at the annular projection 11 and at the annular recesses 12 and 13.

Figure 10:
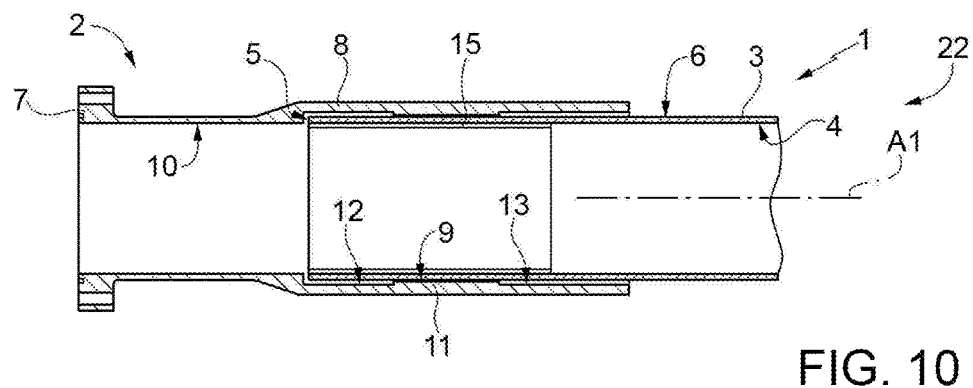

With reference to FIG. 10, the sleeve 15 is arranged solely at the inner wall 4 of the end of the pipeline 1 at the annular projection 11 and the annular recesses 12 and 13, and has the function of preventing excessive stretching and weakening of the coating of the wall 3. In this case, the front face 5 and the portion of outer face 6 housed in the annular recess 12 are protected by an anticorrosion alloy coating.

Figure 11:
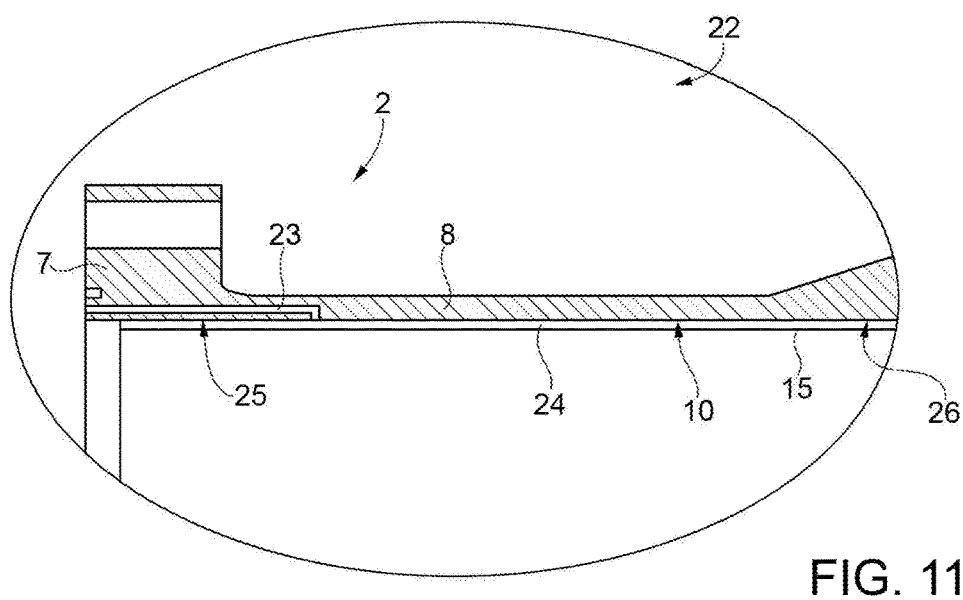
FIG. 11 is a longitudinal section view, on an enlarged scale, and with parts removed for clarity, of a detail of a tubular assembly produced using the method subject of the present disclosure.

With reference to FIG. 11, a tubular assembly 22 is illustrated in which the tubular member 2 has a duct 23 which extends through the tubular body 8 and emerges along the tubular face 10, and in which a sleeve 15 has been cold forged to the tubular body 8 along the tubular face 10 and comprises an annular area 24 in which the sleeve 15 is arranged to contact the tubular portion 8, and two annular areas 25 and 26, which are arranged on opposite sides of the annular area 24 and are forged and sealed to the tubular portion 8. The duct 23 emerges at the area 24 and enables pressurized fluid to be pumped to test the seal of the joints in the annular areas 25 and 26.

In different embodiments, the present disclosure can also be applied to carbon steel pipelines.

Lastly, it should be appreciated that that variations can be made to the present disclosure with respect to the embodiment described without departing from the scope of the following claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of joining a corrosive resistant tubular member and a pipeline configured to convey a corrosive product, said method comprising:

inserting an end of the pipeline inside an inner seat of the corrosive resistant tubular member, wherein the inner seat has an indented axial profile and the pipeline extends along an axis and has a tubular wall which is defined by a supporting structure made of steel and by an inner coating applied to the supporting structure, said tubular wall having a front face, an outer face and an inner face, said inner face configured to align with a tubular face of the corrosive resistant tubular member;

inserting a sleeve of corrosion-resistant material inside at least part of the end of the pipeline, wherein the sleeve has a U-shaped turn-up configured to cover the inner face, the front face, and the outer face of the pipeline, said U-shaped turn-up being housed inside the inner seat between the pipeline and the corrosive resistant tubular member;

inserting an expandable mandrel inside the sleeve; and expanding the expandable mandrel to: (i) join the end of the pipeline and the corrosive resistant tubular member, (ii) seal the sleeve and the pipeline, and (iii) cause the sleeve to shield at least one part of the pipeline from the corrosive product.

2. The method of claim 1, wherein the sleeve is thinner than the pipeline.

3. The method of claim 1, wherein the pipeline is thinner than the corrosive resistant tubular member.

4. The method of claim 1, wherein the expandable mandrel is expanded to produce a plastic deformation of at least the end of the pipeline and the sleeve.

5. The method of claim 1, wherein the expansion of the expandable mandrel is located at least along an annular portion of the sleeve.

6. The method of claim 1, wherein the corrosive resistant tubular member includes, inside the inner seat, an annular projection configured to contact the outer face of the pipeline, and at least one recess at the front face to define the indented axial profile.

7. The method of claim 1, wherein the sleeve extends the entire length of the tubular face.

8. The method of claim 1, wherein inserting the sleeve and the expandable mandrel includes first fitting the sleeve about the expandable mandrel and then inserting the sleeve together with the expandable mandrel inside the pipeline.

9. The method of claim 1, wherein the expandable mandrel includes a center body and at least two sealing rings spaced apart along the center body to define an expansion chamber between the center body, the two sealing rings and the sleeve, wherein expanding the expandable mandrel including pumping pressurized fluid inside the expansion chamber.

10. The method of claim 9, wherein the expandable mandrel includes four sealing rings spaced apart along the center body which define at least two expansion chambers each configured to receive pressurized fluid.

11. The method of claim 1, wherein the corrosive resistant tubular member is at least one of: made of a metallic material resistant to corrosion and has at least a coating suited to protect from any aggressive chemical agents contained in the corrosive product.

12. The method of claim 1, wherein the inner coating is applied to the supporting structure by at least one of: cladding and lining.

* * * * *